(12) United States Patent
Honigfort

(10) Patent No.: US 8,386,512 B2
(45) Date of Patent: Feb. 26, 2013

(54) SYSTEM FOR MANAGING DATA COLLECTION PROCESSES

(75) Inventor: Ed Honigfort, Eureka, MO (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 13/595,442

(22) Filed: Aug. 27, 2012

(65) Prior Publication Data

US 2012/0324463 A1 Dec. 20, 2012

Related U.S. Application Data

(63) Continuation of application No. 12/625,310, filed on Nov. 24, 2009, now Pat. No. 8,275,787, which is a continuation of application No. 11/677,546, filed on Feb. 21, 2007, now Pat. No. 7,627,618.

(51) Int. Cl.
G06F 17/30 (2006.01)
G06F 7/00 (2006.01)
(52) U.S. Cl. ........................................ 707/769
(58) Field of Classification Search ............ None
See application file for complete search history.

(56) References Cited

U.S. PATENT DOCUMENTS

| | | | |
|---|---|---|---|
| 6,735,450 B1 * | 5/2004 | Remmert | 455/550.1 |
| 6,772,202 B2 | 8/2004 | Wright | |
| 7,058,949 B1 | 6/2006 | Willen | |
| 7,093,250 B1 | 8/2006 | Rector | |
| 7,123,608 B1 | 10/2006 | Scott | |
| 7,535,861 B2 * | 5/2009 | Buchholz et al. | 370/310 |
| 7,689,998 B1 * | 3/2010 | Chrysanthakopoulos | 718/104 |
| 2003/0101213 A1 | 5/2003 | Wright | |
| 2003/0172213 A1 | 9/2003 | Garcia | |
| 2004/0064351 A1 | 4/2004 | Mikurak | |
| 2004/0120325 A1 | 6/2004 | Ayres | |
| 2004/0180653 A1 * | 9/2004 | Royalty | 455/431 |
| 2004/0213265 A1 | 10/2004 | Oueslati | |
| 2004/0255295 A1 | 12/2004 | Stackhouse | |
| 2005/0038831 A1 | 2/2005 | Souder | |
| 2006/0133033 A1 * | 6/2006 | Straub et al. | 361/690 |
| 2006/0234691 A1 * | 10/2006 | Dygert | 455/418 |
| 2006/0251115 A1 * | 11/2006 | Haque et al. | 370/466 |
| 2007/0204324 A1 * | 8/2007 | Roberts et al. | 726/1 |

* cited by examiner

Primary Examiner — Kuen Lu
(74) Attorney, Agent, or Firm — Guntin & Gust, PLC; Ed Guntin

(57) ABSTRACT

A system and process for managing data collection processes is disclosed. An apparatus that incorporates teachings of the present disclosure can include, a data collection system having a controller element that assigns to each of the processes a query interval according to a priority level of the data collection process for requesting use of processing resources, receiving one or more requests from the processes, once per respective query interval, for use of at least a portion of available processing resources, releases at least a portion of the available processing resources to a requesting one of the processes when the use of the available processing resources exceeds a utilization threshold. Additional embodiments are disclosed.

20 Claims, 4 Drawing Sheets

```
X = Amount of expected available processing resources = 3
Y = Amount of currently available processing resources = 2
Z = Number of other data collection processes assigned a higher priority level = 5.

Query Interval(X,Y,Z) = A + B(X, Y) + C(Z)

A = Default query interval
  = 30s

B(X, Y) = System delay(X, Y)
        = (System scaling factor)*(X - Y)

B(3, 2) = (50s)*(3 - 2)
        = (50s)*(1)
        = 50s

C(Z) = Additional Delay(Z)
     = (Additional Process scaling factor)(Z)

C(5) = (15s)(5)
     = 75s

Query Interval(3, 2, 5) = A + B(3, 2) + C(5)
                       = 30s + 75s + 50s
                       = 155s
```

FIG. 3

SYSTEM FOR MANAGING DATA COLLECTION PROCESSES

CROSS-REFERENCE TO RELATED APPLICATIONS

This application is a continuation of U.S. patent application Ser. No. 12/625,310 filed Nov. 24, 2009, which is a continuation of U.S. patent application Ser. No. 11/677,546 filed Feb. 21, 2007, both of which are incorporated herein by reference in their entirety.

FIELD OF THE DISCLOSURE

The present disclosure relates generally to data management systems, and more specifically to a system for managing data collection processes.

BACKGROUND OF THE DISCLOSURE

Computing system performance is generally dependent on the proper management of the execution of software processes (also referred to as jobs, or tasks). In small scale systems, managing the execution of processes is relatively straightforward and can be normally accomplished through a first-in, first-out (FIFO) method for organizing said processes. In small scale systems, the number of processes is typically small and the computing resources required are nominal. Consequently, the amount of delay in completing a process is insignificant and does not adversely affect system performance.

In large scale systems with processes requiring significant computing resources such as in a data collection system which retrieves, stores and manages large databases for data mining purposes, a queuing method such as a FIFO can substantially impact throughput performance of critical processes when all processes including non-critical processes are given equal access to computing resources.

A need therefore arises for a system for managing data collection processes.

BRIEF DESCRIPTION OF THE DRAWINGS

FIG. 3 depicts an illustration for calculating a query interval for data collection processes operating in the system.

DETAILED DESCRIPTION OF THE DRAWINGS

Embodiments in accordance with the present disclosure provide for a system for managing data collection processes.

In a first embodiment of the present disclosure, a data collection system can have a controller element that assigns a priority level to each of a plurality of processes for collecting data in the data collection system, assigns a query interval for requesting use of available processing resources of the controller element to each of the plurality of processes according to their respective assigned priority level, prompts each of the plurality of pending processes according to their respective query interval to request use of at least a portion of available processing resources of the controller element, releases at least a portion of the available processing resources of the controller element to a requesting one of the plurality of processes when the utilization of available processing resources exceeds a utilization threshold, and modifies the query interval of one or more of the plurality of processes after occurrence of a triggering event.

In a second embodiment of the present disclosure, a computing device can include a controller element that generates data and prompts a data collection system to transfer data between the data collection system and the computing device. The data collection system can assign a priority level to each of a plurality of processes, where at least one of the plurality of processes comprises a process associated with transferring data between the computing device and the data collection system, compute a query interval for each of the plurality of processes according to their respective assigned priority level and available processing resources of the data collection system, release at least a portion of the available processing resources of the data collection system to a requesting one of the plurality of processes according to release criteria, and re-compute the query interval of one or more of the plurality of processes upon occurrence of one or more triggering events.

In a third embodiment of the present disclosure, a computer-readable storage medium in a data collection system is provided, where the storage medium can include computer instructions for assigning a priority level to each of a plurality of processes, computing a query interval for each of the plurality of processes according to their respective assigned priority level and available processing resources, prompting one or more of the plurality of processes according to their respective query interval to request use of at least a portion of the available processing resources, releasing at least a portion of the available processing resources to a requesting one of the plurality of processes according to release criteria, and re-computing the query interval of one or more processes upon occurrence of one or more triggering events.

Figure 1:
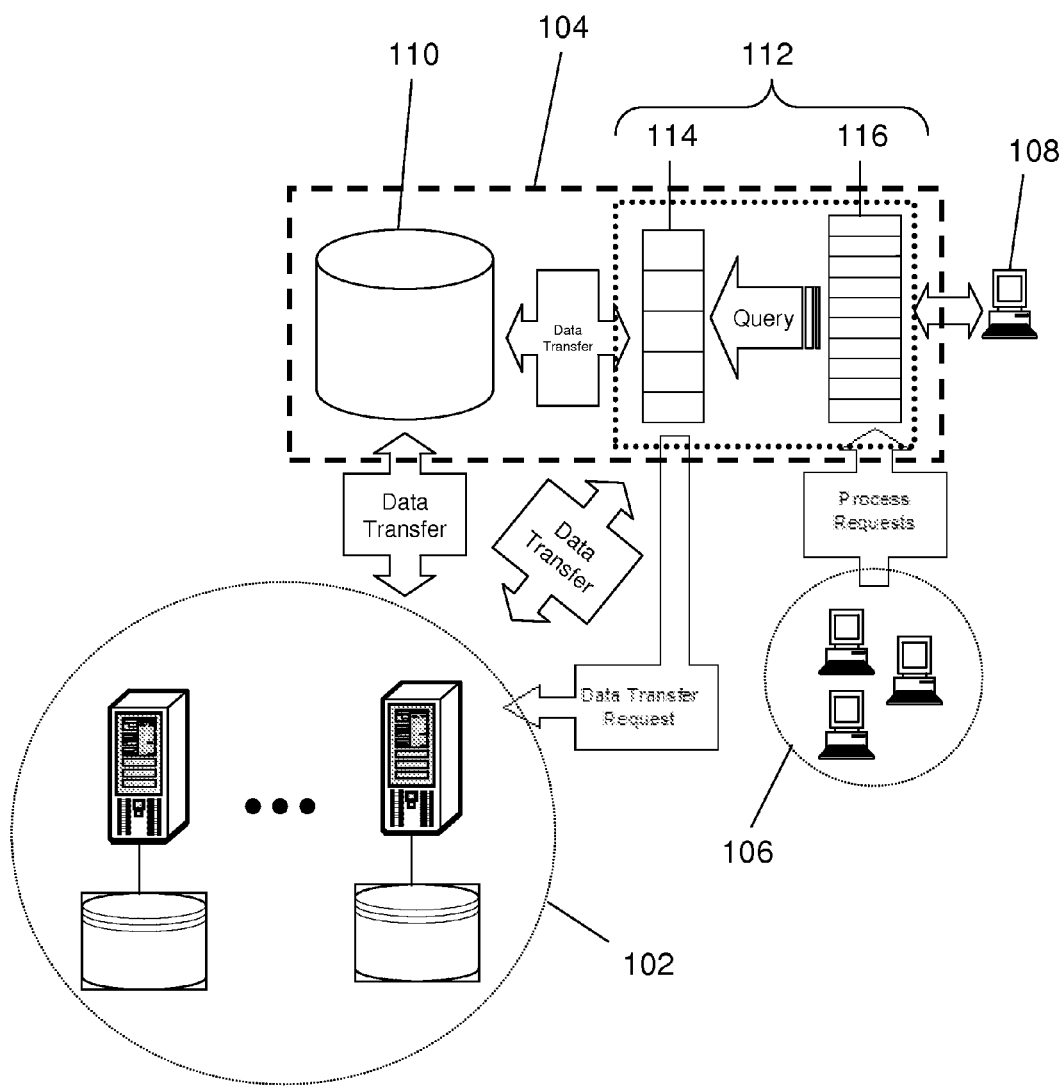
FIG. 1 depicts an exemplary embodiment of a system for managing data collection.

FIG. 1 depicts an exemplary embodiment of a system 100 for managing data collection. The system 100 can comprise one or more remote computing devices (RCDs) 102 accessible by a data collection system (DCS) 104 that manages execution of data collection processes, such as uploading and downloading of data from the RCDs 102. In the system 100, data collection processes can be submitted to the DCS 104 from one or more user interfaces or terminals 106. Additionally, the DCS 104 can be monitored and controlled via an administrator interface 108 that provides administrator access to the DCS 104. Although shown as a single computing system, the DCS 104 can be represented as centralized or decentralized computing devices.

Similarly, RCDs 102 can also operate as single computing systems or as centralized or decentralized computing devices. For example, in a system 100 for managing data collections processes for a telecommunications network, RCDs 102 can comprise order management systems, IP Multimedia Subsystems, customer premise equipment provisioning systems, voicemail systems, or address book systems just to mention a few. Other telecommunication systems not described herein that can operate as RCDs 102 for the purpose of data collection processing can also be applied to the present disclosure.

A DCS 104 operating in the system 100 can comprise a mass storage system 110 and a controller element 112. The mass storage system 110 can utilize common storage technologies (e.g., hard disk drives, flash memory, etc.) to store data from one or more of the RCDs 102 in one or more databases. The controller element 112 can utilize common computing technologies (e.g., desktop computer, server, etc.) to manage use of available processing resources 114 (e.g., a plurality of common slidable computing cards inserted or removed from a shelf) of the DCS 104 for executing one or more data collection processes in a list of pending processes 116 stored by the DCS 104.

Figure 2:
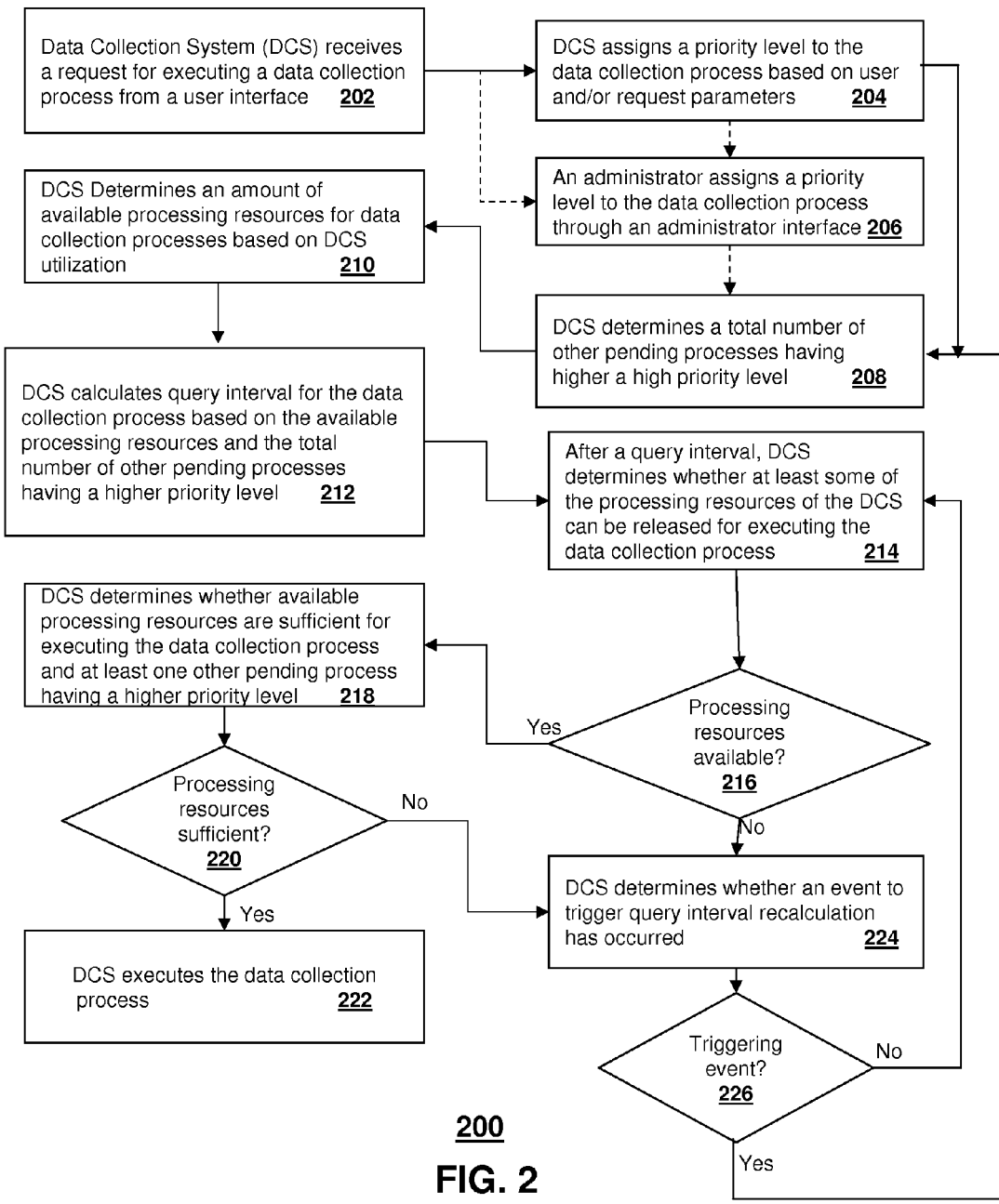
FIG. 2 depicts an exemplary method operating in portions of the system.

FIG. 2 depicts an exemplary method 200 operating in portions of the system 100. Method 200 begins with step 202 in which a request for execution of one or more data collection processes is submitted through the user interface 106 to the DCS 104. Data collection processes can correspond to software processes that transfer data between RCDs 102 and the DCS 104. Data collection processes can also be adapted for other applications. For example, system 100 can be used for generating databases for data mining purposes and a data collection process defined by a user request can be configured to cause the DCS 104 to retrieve data from the RCDs 102 and process said data with pattern recognition methods that can detect demographic and/or psychographic data patterns. Data collection process can be configured to segment the data being transferred between the DCS 104 and the RCDs 102. For example, data collected by a data collection process can be segmented according to customer information, product information, or service information, each of which can be processed by the aforementioned pattern recognition method for data mining purposes.

In response to the request submitted in step 202, the DCS 104 can add the one or more associated data collection processes to the list of pending processes 116. In step 204 the DCS 104 can assign each of these data collection processes a priority level. The DCS 104 can assign a priority level in several ways. For example, the priority level can be based on the type of user submitting the process request. That is, data collection processes submitted by some users can receive a higher priority than processes submitted by other users. A higher priority level can also be assigned by the DCS 104 to data collection processes according to parameters specified by the user when creating the request.

For example, a parameter can be included with a request defining a critical date by which an associated data collection process must be completed. The DCS 104 can also assign a priority level based on a proximity to the critical date. The DCS 104 can also use a combination of parameters included in the request to assign a priority level to a data collection process. For example, a first data collection process associated with a request including a critical date and submitted by a low priority user can be assigned the same priority level as a second data collection process associated with a request identifying no critical date but submitted by a higher priority user.

The priority level for a data collection process can also be assigned by way of the administrator interface 108. For instance, in step 206, an administrator can manually assign a priority level to a data collection process through an administrator interface 108 having access to the DCS 104. The administrator can also override a priority level already assigned to the data collection process during step 204. This provides the administrator with the ability to manually manage the list of pending data collection processes 116 and allow one or more data collection processes to be executed sooner or later than it would normally be processed by a resource 114 of the DCS 104.

In prior art systems, a data collection system manages its processing resources by releasing at least a portion of its available processing resources in response to a request by a data collection process for available processing resources. Method 200 instead manages the release of processing resources 114 to data collection processes by computing a query interval in step 212 that can vary according the priority level of the pending data collection process 116 and the amount of processing resources 114 available in the DCS 104. In preparation for calculating the query interval for a particular data collection process, the DCS 104 can be configured to determine, in step 208, how many other data collection processes in the list of pending data collection processes 116 have been assigned a higher priority level than the data collection process in question. Concurrently or consecutively, in step 210, the DCS 104 can also be configured to determine the amount of the processing resources 114 available to be released to the pending data collection processes 116.

Steps 208-210 serve to ensure sufficient processing resources are available for both data collection processes and other activities of the DCS 104 such as data mining. To assure that data mining activities have sufficient processing resources, the DCS 104 can be configured to determine whether too many data mining activities are being interrupted by data collection processes and therefrom respond by reducing the processing resources 114 released to data collection processes. This forced reduction, reserves a portion of the processing resources 114 for data mining and other related activities.

Conversely, if the DCS 104 determines that data mining and other related activities are not being impacted by data collection processes, the amount of processing resources 114 made available to pending data collection processes 116 can be increased. The DCS 104 can continue to increase the processing resources 114 until an adequate load balance is achieved between processing resources assigned to data collection processes and those reserved for data mining processes. The DCS 104 can also monitor and control its workload by comparing the total utilization of the processing resources 114 to one or more utilization threshold values, which can automatically trigger the DCS to reduce or increase the amount of processing resources 114 released to pending data collection processes 116. Such threshold values can vary according to time of day or according to any other parameter suitable to the present disclosure. Alternatively, an administrator can manually adjust the amount of processing resources 114 released to data collection processes to achieve similar results.

With these principles in mind, the DCS 104 calculates in step 212 a query interval for each data collection process based on the amount of processing resources 114 available to be used by data collection processes determined in step 210 and the total number of other data collection processes assigned a higher priority than the data collection process determined in step 208. Because the priority of data collection processes can vary, the query interval of data collection processes can also vary.

A variable query interval such as described can result in an increased probability that the DCS 104 will release an available resource from the list of processing resources 114 to data collection processes assigned a higher priority level. For example, a data collection process assigned a low priority level can be assigned a longer query interval by the DCS 104 causing it to query (or request) a processing resource less frequently. In contrast, a data collection process assigned a high priority level can have a shorter query interval causing it to query for an available processing resource more frequently.

Because the amount of processing resources 114 available can vary over time, the more frequently a data collection process can query the DCS 104 to release at least a portion of the processing resources 114 the more likely the query will coincide with a time when the amount of processing resources available are sufficient to execute the requesting data collection process. It follows also that data collection processes that query the DCS 104 more frequently will have a higher probability of being executed prior to data collection processes querying the DCS less frequently (i.e. those having a longer query interval).

A method for calculating the query interval is illustrated in FIG. 3. In this illustration, a query interval can calculated from the sum of a default query interval (A), a system delay time (B) associated with the amount of processing resources 114 available and an additional delay time (e) accounting for any other data collection processes in the list of pending processes 116 assigned a higher priority level.

The default query interval (A) used in the exemplary calculation of FIG. 3 can be an initial query interval that can be assigned to every data collection process as a variable delay. The initial query interval can be a static value selected by an administrator or a default value assigned by the DCS 104. The default query interval value (A) can also be calculated from an average of the query intervals assigned to the data collection processes already in the list of pending processes 116 or according to a measure of resources actively engaged by the DCS 104. For illustration purposes only, the default query interval has been set to 30 seconds according to any of the aforementioned embodiments.

The system delay time (B) can be used to account for variations in the amount of processing resources 114 available to pending data collection processes 116. The system delay time (B) manages the workload of the DCS 104 by adjusting the query interval for each data collection process in the list of pending processes 116, thus increasing or decreasing the probability of execution of said pending processes. The calculated system delay time (B) can serve as a variable delay. The system delay time (B) can be a function of the amount of expected available processing resources (X) and the amount of currently available processing resources (Y). In particular, the system delay time (B) can be expressed as the difference between the expected and currently available processing resources (X−Y).

Said difference (X−Y) can be scaled by a system scaling factor such as a given an amount of time. The system scaling factor in the present illustration is given as 50 seconds. Consequently, if there are 3 normally available processing resources (X=3) and 2 currently available processing resources (Y=2), a system delay time is determined to be equal to (X−Y)(50 s)=(3−2)(50 s) or 50 seconds. It follows that as the amount of processing resources increases, the query interval is decreased by the system delay time (B) and the probability of execution of a data collection process increases. Similarly, as the amount of available processing resources is decreased, the query interval is increased by the system delay time (B) and the probability of execution of a data collection process is decreased.

Along with the system delay time (B), the additional delay time (C) can be used to individually adjust the query interval of each data collection process according to the number of other data collection processes assigned a higher priority. The calculated additional delay time (C) can also serve as a variable delay. The additional delay time (C) can be a function of the total number of other data collection processes assigned a higher priority level (Z) scaled by an additional process scaling factor based on a fixed given time such as 15 s. For example, if there are 5 other data collection processes assigned a higher priority level (Z=5), the additional delay time would be equal to (Z)(15 s)=(5)(15 s) or 75 seconds, which increases the query interval and decreases the probability the data collection process will be executed. Thus for a given data collection process as the number of other data collection processes having a higher priority level decreases, the additional delay time (C) also decreases, thereby increasing the probability the data collection process will be executed.

Based on the default query interval (A), the system delay time (B), and the additional delay time (C), the DCS 104 can calculate the query interval as a variable factor (query interval=A+B+C). For example, according to the illustration of FIG. 3 the query interval would be the sum of the default query interval (A=30 s), the system delay time (B=50 s), and the additional delay time (C=75 s) or A+B+C=30 s+50 s+ 75 s=155 seconds.

The query interval can be further refined to improve performance of the DCS 104. One method is to assign data collection processes having similar calculated query intervals the same query interval, such as calculated query interval in a specific range. For example, if a first group of data collection processes have a calculated query interval between 1 and 40 seconds, the DCS 104 can assign all the processes in the first group a first common query interval, such as 20 seconds. A second group of data collection processes in the range of 40 to 90 seconds may be similarly assigned a second common query interval, such as 60 seconds, and so forth. Assigning multiple data collection processes the same query interval can reduce the need for the overhead in performing the calculations illustrated in FIG. 3.

Once the query interval for a data collection process is calculated in step 212, the data collection process can query in step 214 the DCS 104 at its prescribed query interval to determine whether processing resources 114 of the DCS 104 are available. In step 218 the DCS 104 can be configured to determine whether the amount of available processing resources 114 are sufficient for executing the data collection process and at least one other data collection process in the list of pending processes 116 assigned a higher priority level. This step assures that at least one higher priority data collection process can be executed thereafter. Once the DCS 104 determines that the amount of available processing resources 114 is sufficient for executing the data collection process in question in step 220, the DCS releases in step 222 at least a portion of the available processing resources 114 to said data collection process. If it is determined in step 220 that none of the processing resources 114 can be released to the requesting data collection process, the requesting process will return to a pending state in which it will not submit another request for resources until passage of another query interval in step 214.

It should be noted that the query interval does not have to be static and can be modified or re-computed over time based on the occurrence of a triggering event. For example, in step 224, the DCS 104 can be configured to determine whether a triggering event has occurred that requires recalculation of the query interval for data collection processes in the list of pending processes 116. Various types of events can be monitored by the DCS 104 to trigger recalculation of the query interval. A first type of event can be the passage of a fixed interval of time, such as 5 minutes or some other suitable interval of time. A second type of event can be the workload or utilization resources of the DCS 104 exceeding a utilization threshold. To determine such an event has occurred, the DCS 104 can be configured to determine whether the total utilization of the processing resources 114 has exceeded a utilization threshold value. For example, if the DCS 104 determines that 90% of the processing resources 114 are being used and the utilization threshold is only 70%, recalculation of the query interval can be triggered for all of data collection processes to reduce the workload on the DCS.

A third type of triggering event can be a change in the total number of data collection processes in the list of pending processes 116 or a change in the total number of data collection processes in the list of pending processes assigned a particular or range of priority levels. Each of these events can be assigned a quantity threshold value. Exceeding anyone of these quantity thresholds can signal the DCS 104 that a query interval recalculation is necessary to avoid having too many processes in queue.

Once the DCS 104 detects that a triggering event has occurred in step 226 then the process of determining the query interval, steps 208-212, can be repeated to determine a new query interval for one or more data collection processes in the list of pending processes. By repeating steps 208, 210 and 212, the new query interval can take into account the aforementioned changes in the number and priority level of the data collection processes in the list of pending processes 116 and the current workload of the DCS 104. If the DCS 104 does not detect that a triggering event has occurred in step 226, then the query interval can be left unchanged. The various steps in method 200 can be repeated from step 208 for each of the data collection processes in the list of pending processes 116 until all processes in the list of pending processes 116 are executed.

Method 200 provides a means to more efficiently assign processing resources of the DCS 104 to pending data collection processes. It would be apparent by these examples that several modifications can be applied to the present disclosure without departing from the scope of the claims stated below. Accordingly, the reader is directed to the claims section for a fuller understanding of the breadth and scope of the present disclosure.

Figure 4:
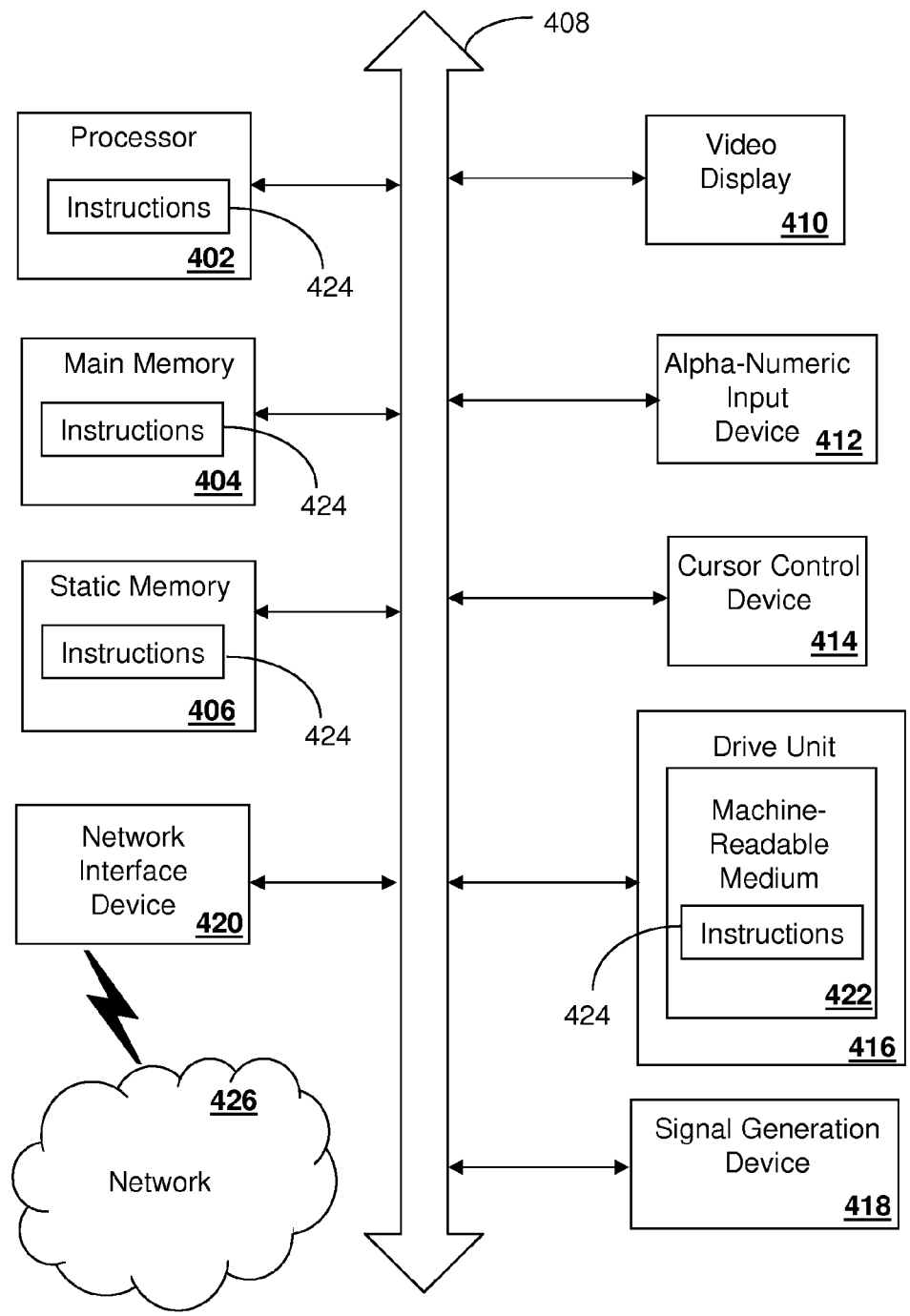
FIG. 4 depicts an exemplary diagrammatic representation of a machine in the form of a computer system within which a set of instructions, when executed, can cause the machine to perform anyone or more of the methodologies disclosed herein.

FIG. 4 depicts an exemplary diagrammatic representation of a machine in the form of a computer system 400 within which a set of instructions, when executed, can cause the machine to perform anyone or more of the methodologies discussed above. In some embodiments, the machine operates as a standalone device. In some embodiments, the machine can be connected (e.g., using a network) to other machines. In a networked deployment, the machine can operate in the capacity of a server or a client user machine in server-client user network environment, or as a peer machine in a peer-to-peer (or distributed) network environment.

The machine can comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform anyone or more of the methodologies discussed herein.

The computer system 400 can include a processor 402 (e.g., a central processing unit (CPU), a graphics processing unit (GPU, or both), a main memory 404 and a static memory 406, which communicate with each other via a bus 408. The computer system 400 can further include a video display unit 410 (e.g., a liquid crystal display (LCD), a flat panel, a solid state display, or a cathode ray tube (CRT)). The computer system 400 can include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 can include a machine-readable medium 422 on which can be stored one or more sets of instructions (e.g., software 424) embodying anyone or more of the methodologies or functions described herein, including those methods illustrated above. The instructions 424 can also reside, completely or at least partially, within the main memory 404, the static memory 406, and/or within the processor 402 during execution thereof by the computer system 400. The main memory 404 and the processor 402 also can constitute machine-readable media.

Dedicated hardware implementations including, but not limited to, application specific integrated circuits, programmable logic arrays and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system can be applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 can further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives can be considered a distribution medium equivalent to a tangible storage medium. Accordingly, the disclosure is considered to include anyone or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.P.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    assigning, by a system comprising a processor, a respective priority level to each data collection process of a plurality of data collection processes for collecting data from one or more remote computing devices;
    assigning, by the system, a query interval to a data collection process of the plurality of data collection processes at least in part according to a priority level of the data collection process;
    receiving, by the system, one or more requests from the data collection process for use of at least a portion of available processing resources of a controller, wherein the one or more requests are sent by the data collection process once per the query interval; and
    releasing, by the system, the portion of the available processing resources of the controller to the requesting data collection process when the use of the available processing resources exceeds a first utilization threshold.

2. The method of claim 1, wherein the query interval comprises a frequency for requesting the available processing resources, and wherein the releasing of the portion of the available processing resources is repeated at the query interval.

3. The method of claim 1, comprising determining, by the system, a computed query interval of the data collection process according to a sum of a default query interval and an additional delay time assigned to each one of the plurality of data collection processes assigned a priority level exceeding the respective priority level assigned to the data collection process.

4. The method of claim 3, comprising determining, by the system, a re-computed query interval of the data collection process according to a sum of an additional delay time assigned to each one of one or more of the plurality of data collection processes assigned a priority level exceeding the respective priority level assigned to the data collection process and a system delay time determined from the available processing resources of the controller.

5. The method of claim 1, comprising determining, by the system, a computed query interval of the data collection process according to a sum of a default query interval and a system delay time determined from the available of processing resources of the controller.

6. The method of claim 1, comprising applying, by the system, a release criteria to the release step, wherein the release criteria comprises having available processing resources sufficient for processing the request from the data collection process and one or more of the plurality of data collection processes assigned a priority level exceeding the respective priority level of a requesting one of the plurality of data collection processes.

7. The method of claim 1, comprising modifying the query interval of the data collection process after occurrence of a triggering event, wherein the triggering event comprises at least one of an interval of time, the use of the available processing resources of the data collection system exceeding the first utilization threshold, or a quantity of the plurality of data collection processes pending execution exceeding a quantity threshold.

8. A processor comprising:
    a memory storing computer instructions; and
    a controller coupled to the memory, wherein the controller, responsive to executing the computer instructions performs operations comprising:
        assigning a query interval to a data collection process of a plurality of data collection processes at least in part according to a priority level of the data collection process, wherein each data collection process of the plurality of data collection processes, responsive to being executed, collects data from one or more remote computing devices;

receiving one or more requests from the data collection process for use of at least a portion of available processing resources of the controller, wherein the one or more requests are sent by the data collection process once per the query interval; and releasing the portion of the available processing resources of the controller to the requesting data collection process when the use of the available processing resources exceeds a first utilization threshold.

9. The processor of claim 8, wherein the query intervals comprise a frequency for requesting the available processing resources, and wherein the controller further performs operations comprising repeating the release step at the query interval.

10. The processor of claim 8, wherein the controller further performs operations comprising determining a computed query interval of the data collection process according to a sum of a default query interval and an additional delay time assigned to each one of the plurality of data collection processes having a priority level exceeding a respective priority level of the data collection process.

11. The processor of claim 8, wherein the controller further performs operations comprising determining a computed query interval of the data collection process according to a sum of a default query interval and a system delay time determined from the available of processing resources of the controller.

12. The processor of claim 8, wherein the controller further performs operations comprising determining a re-computed query interval of the data collection process according to a sum of an additional delay time assigned to each one of one or more of the plurality of data collection processes having a priority level exceeding a respective priority level of the data collection process and a system delay time determined from the available processing resources of the controller.

13. The processor of claim 8, wherein the controller further performs operations comprising applying a release criteria to the release step, wherein the release criteria comprises having available processing resources sufficient for processing the request from the data collection process and one or more of the plurality of data collection processes having a priority level exceeding a respective priority level of a requesting one of the plurality of data collection processes.

14. The processor of claim 8, wherein the controller further performs operations comprising modifying the query interval of the data collection process after occurrence of a triggering event, wherein the triggering event comprises at least one of an interval of time, the use of the available processing resources of the data collection system exceeding the first utilization threshold, or a quantity of the plurality of data collection processes pending execution exceeding a quantity threshold.

15. A computer-readable storage medium, comprising computer instruction, which when executed by a processor cause the processor to perform operations comprising:

determining a frequency for requesting available processing resources for each of a plurality of processes according to their respective priority level to generate a query interval;

receiving one or more requests from a process of the plurality of processes for use of at least a portion of the available processing resources, wherein the one or more requests are sent by the process once per the query interval;

releasing at least a portion of the available processing resources to the requesting process according to release criteria; and re-computing the determined frequency of one or more processes upon occurrence of one or more triggering events to generate an updated query interval.

16. The computer-readable storage medium of claim 15, wherein the processor further performs operations comprising repeating releasing steps according to the determined frequency.

17. The computer-readable storage medium of claim 15, wherein the processor further performs operations comprising re-computing the determined frequency of the process according to a sum of a default query interval, an additional delay time assigned to each of one or more other processes having a respective priority level exceeding a respective priority level assigned to the process, and a system delay time determined from the available processing resources of the processor.

18. The computer-readable storage medium of claim 15, wherein the processor further performs operations comprising re-computing the determined frequency of the process according to a sum of an additional delay time assigned to each one of one or more processes respectively having a higher priority exceeding a respective priority level of the process and a system delay time determined from the available processing resources of the processor.

19. The computer-readable storage medium of claim 15, wherein the release criteria comprises having available processing resources sufficient for executing the requesting process and at least one of the plurality of processes having a priority level exceeding the respective priority level of the requesting process.

20. The computer-readable storage medium of claim 15, wherein the processor further performs operations comprising determining the available of processing resources of the processor, wherein the one or more triggering events comprise at least one of an interval of time, the use of the available processing resources of the processor exceeding a utilization threshold, or a quantity of the plurality of processes pending execution exceeding a quantity threshold.

\* \* \* \* \*